United States Patent

Baldauf, Jr.

[15] 3,636,462
[45] Jan. 18, 1972

[54] AUTOMATIC DC LEVEL CONTROLLING SYSTEM FOR A DC-COUPLED AMPLIFIER

[72] Inventor: William A. Baldauf, Jr., Oak Ridge, Tenn.

[73] Assignee: The United States of America as represented by the United States Atomic Energy Commission

[22] Filed: Dec. 11, 1970

[21] Appl. No.: 97,233

[52] U.S. Cl. .................................330/9, 330/139, 330/85, 330/96, 328/175, 328/162
[51] Int. Cl. ...........................................H03f 1/02
[58] Field of Search .................330/9, 139, 85, 96; 328/162, 328/175; 307/264; 356/106 T

[56] References Cited

UNITED STATES PATENTS 3,309,615   3/1967   Baldwin et al. ......................328/175
3,534,273  10/1970   Thomas ..............................328/162

Primary Examiner—Nathan Kaufman
Attorney—Roland A. Anderson

[57] ABSTRACT

A system has been provided which automatically compensates for DC level drift of the interference signal DC-coupled amplifier in a laser interferometer system. An analog feedback signal provides automatic compensation of the DC level at the input of a DC amplifier by sensing when the DC level at the output of the amplifier drifts out of a specific range. A bidirectional counter is controlled by the sensor to record increments of correction which are converted to an analog signal by a digital-to-analog converter and after appropriately amplified is fed back to the input of the amplifier to compensate for the detected drift and bring the DC level back within the specified range.

7 Claims, 2 Drawing Figures

INVENTOR.
William A. Baldauf, Jr.

AUTOMATIC DC LEVEL CONTROLLING SYSTEM FOR A DC-COUPLED AMPLIFIER

BACKGROUND OF THE INVENTION

The present invention was made during the course of, or under, a contract with the United States Atomic Energy Commission.

The invention described herein relates generally to DC level drift control in DC-coupled amplifiers which have signals whose information is contained in the signal phase, and more particularly to an automatic DC level controller which provides improved instrument precision by compensating for the amplifier drift. The invention is particularly useful for controlling drift in laser interferometer feedback systems wherein the detection of two phase-displaced light interference signals results in voltage signals which have a quadrature relationship to each other. This quadrature relationship must be maintained in order to provide accurate control of a machine by an interferometer.

The electronics conventionally used to produce the quadrature signals and sense movement and direction of movement consist of a two-channel system, each channel consisting of a photodetector, such as a photosensitive semiconductor; a DC-coupled amplifier; a signal-squaring circuit which changes states at the time of a zero crossing, usually a Schmitt trigger; and direction-sensing logic.

Laser interferometers are being used as significantly better feedback devices for numerically controlled machine tools. Interferometric methods for measuring length have been proven to be highly accurate, and it is only the question of ease of operation, reliability, and cost that has limited their application. The interferometry technique described above depends upon there being a quadrature relationship between the two detector signals after squaring in their respective Schmitt triggers. The quadrature relationship needed is not absolute but must be good enough so that one signal is high when the other signal makes a transition from low to high or high to low at integral $\lambda_E$ (effective wavelength of the detected light beams) intervals. The desired quadrature relationship will be described as virtual. A loss of the virtual quadrature relationship can produce one of several symptoms: (1) If both squared signals still make transitions but are phase-shifted more than 90 degrees from the absolute quadrature the sense of any movement will be reversed. (2) If either of the two signals is always high or low there appears to be no net movement. The actual phase relationship of the two signals is primarily a function of their DC levels with respect to their respective Schmitt triggers.

Before operating an interferometer system, the DC level would be manually set to zero volt while monitoring the DC level at the input to the Schmitt trigger. In operation, some drift of the DC level is expected due to laser output intensity changes, misalignment of the optics with respect to the line of actual machine axis travel, and drift in the DC-coupled amplifier. Experience with interferometer systems which have only manual DC level adjustments have shown that frequent periodic adjustments by instrument mechanics using an oscilloscope are necessary to maintain the virtual quadrature relationship. Consequently, a system is desired which will, after a setup adjustment, automatically compensate for DC level drifts caused by any of the above factors.

SUMMARY OF THE INVENTION

It is an object of this invention to provide a system which automatically compensates for signal DC level drift in a DC-coupled amplifier system.

Further, it is an object of the present invention to provide a system for compensation of signal DC level drift in a laser interferometer system.

Briefly, the invention is an automatic DC level control system for a DC-coupled amplifier, comprising: a bidirectional counter; a comparator means coupled to the output of said amplifier for comparing the DC voltage at the output of said amplifier with a first reference voltage for providing a first output signal at an output thereof when the amplifier voltage exceeds said first reference voltage and with a second reference voltage for providing a second output signal at the output thereof when the amplifier voltage drops below the second reference voltage; an oscillator for generating clock pulses at an output thereof; a gating means having a first input connected to the output of the oscillator and a second input connected to the output of the comparator means and an output connected to the count input of the counter for gating the oscillator pulses into the counter responsive to the output of said comparator means; means responsive to the output of said comparator means for controlling the direction of counting of said bidirectional counter; and a digital-to-analog converter connected between the output of the counter and the input of the DC-coupled amplifier thereby controlling the DC level of the amplifier according to the count stored in the counter.

Other objects and many of the attendant advantages of the present invention will be obvious from the following detailed description of the preferred embodiment of the invention.

DETAILED DESCRIPTION

Although the invention is applicable to various DC-coupled amplifier systems, the invention will be described herein as embodied in a laser interferometer feedback system wherein pulses indicating direction and increments of movement sensed by the interferometer feedback detector are processed by a two-channel detection system including a pair of DC amplifiers. Therefore, the invention should not be considered as limited to the embodiment within which it is herein described for the purpose of illustrating the best mode of operation contemplated by the inventor.

Figure 1:
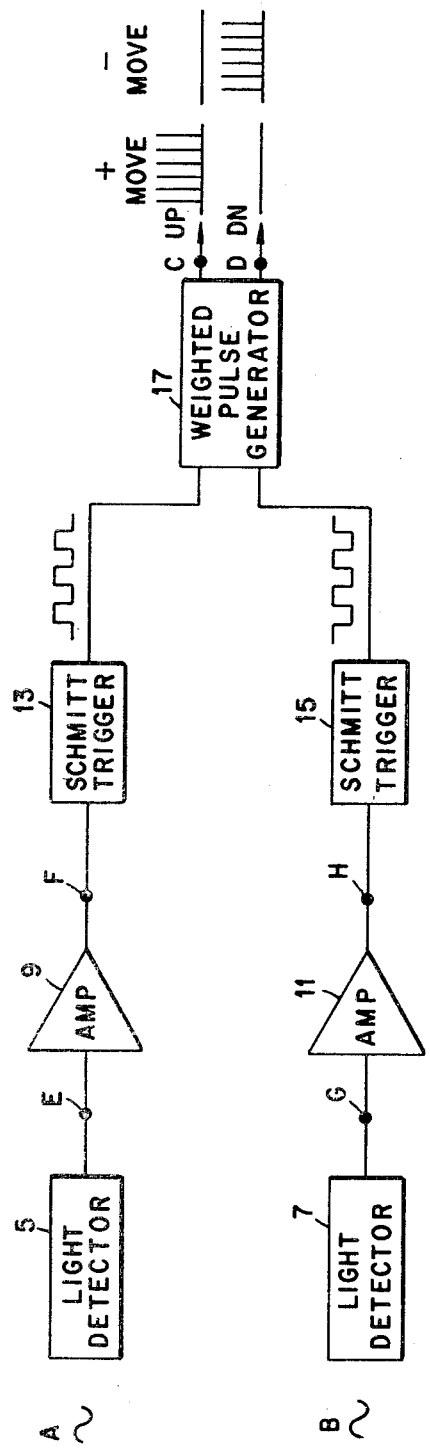
FIG. 1 is a block diagram of an interferometer feedback system with which the invention may be used.

As discussed, one form of a laser interferometer system used in many production machining facilities employs a continuous wave laser beam which makes use of the phase shifting characteristics of the reflective surface of a beam splitter to obtain two interference signals displaced by ($\lambda/4$). Detection of these two phase-displaced interference fringe signals results in voltage signals which have a quadrature relationship to each other as shown in FIG. 1. The fringe signals A and B are detected by light detectors 5 and 7, respectively, amplified by DC-coupled amplifiers 9 and 11 and converted to square waves by Schmitt trigger circuits 13 and 15 before going to a weighted pulse generator 17. In the past, the quadrature signals have had the precision of their quadrature relationship distorted by drift of the DC levels in the amplifiers 9 and 11 preceding the Schmitt trigger circuits.

The above-described system is well known in the art of laser interferometry and therefore need not be discussed further herein for a complete understanding of the invention from the following description.

The DC levels in the above-described circuits must be maintained very close to the operating points of the Schmitt trigger and preferably between them or it is possible that one of the Schmitt triggers will not fire, or even if both fire, the phase shift will be such that the distance-weighted pulses will not be generated. In the prior art, it has been the duty of the operator to manually reset the DC level after observing it drift. Some means was therefore necessary to automatically adjust the DC levels of the quadrature fringe signals of the laser interferometer to thereby increase the reliability and accuracy of the laser interferometer and further simplify its operation.

Figure 2:
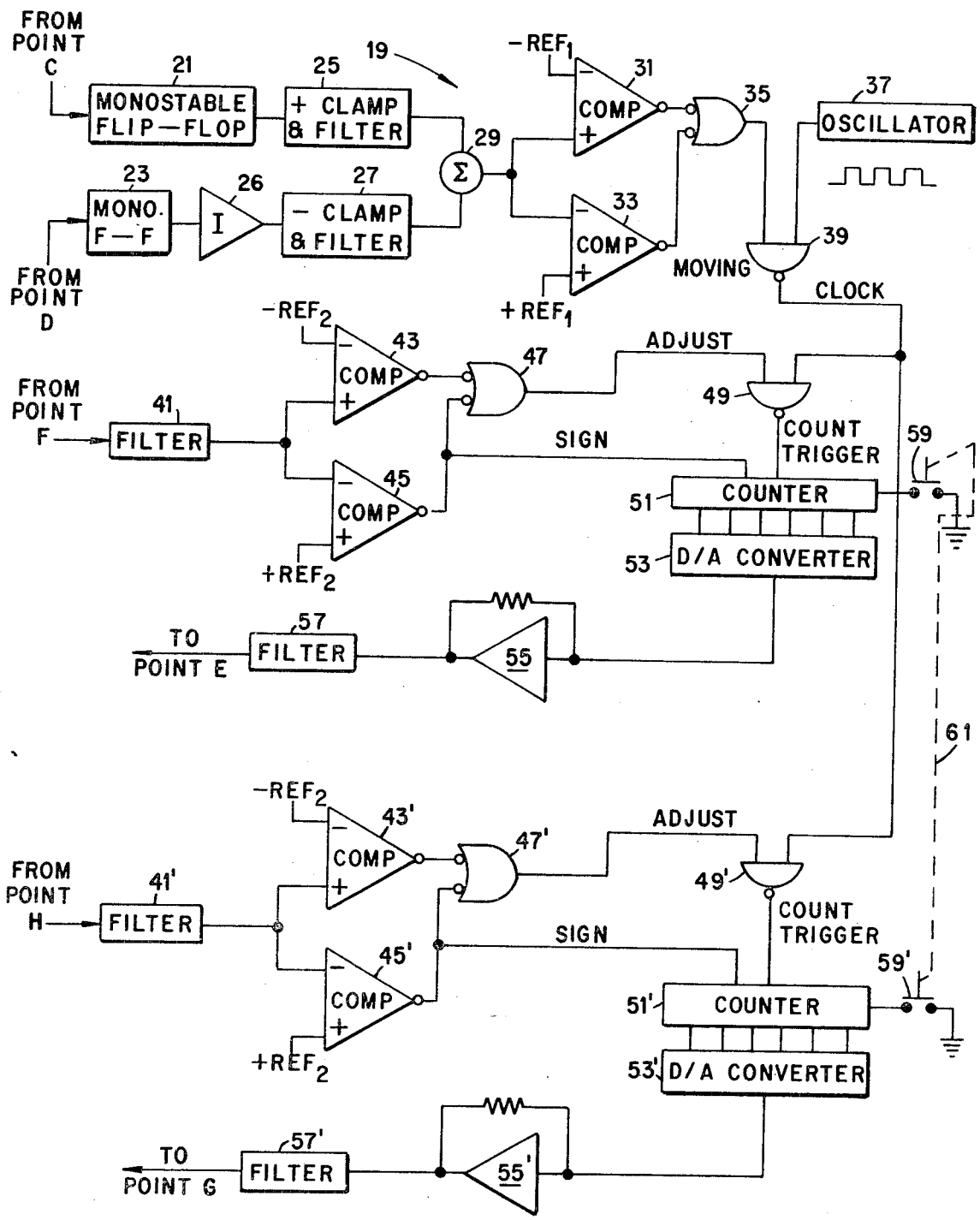
FIG. 2 is a block diagram of the DC level controller according to the present invention as it is used with the interferometer feedback system of FIG. 1.

Referring now to FIG. 2, there is shown a circuit that has been devised within the teachings of the present invention which is applicable to the control of the signal DC level drift of both amplifiers 9 and 11 of FIG. 1. The connection between figures is indicated by corresponding reference characters. In this embodiment, the bias voltage adjustment must be made when the net rate of the distance-weighted pulses at the outputs of generator 17 is other than zero. In other words, the machine axis, or whatever movement the interferometer is measuring, must be moving. Obviously, other checking circuits may be provided for various other systems in which the invention may be used. The moving condition is checked by the moving detector generally indicated by reference numeral 19. The moving detector has for its inputs the up and down pulses from outputs C and D of generator 17, respectively, which also go to the measuring system counters (not shown). Output C is connected to the input C of a first monostable flip-flop 21 while output D is connected to the input D of a second monostable flip-flop 23. The monostable flip-flops are not absolutely necessary. They are needed in this case to broaden the up and down pulses from approximately $300 \times 10^{-9}$ sec. to $1 \times 10^{-}$ sec. in order to increase the sensitivity of the moving detector. The output of flip-flop 21 is connected to the input of a first clamping and filter circuit 25 which provides a positive-going signal clamped to ground at the output thereof. The output of flip-flop 23 is connected through an inverter 26 to the input of a second clamping and filter circuit 27 which provides a negative-going signal clamped to ground. The outputs of both filters 25 and 27 are connected to summing inputs of a summing network 29. The output of network 29 is connected to the noninverting input of a comparator 31 and to the inverting input of a second comparator 33. Comparator 31 has a negative reference voltage applied to the inverting input thereof and responds to a negative signal which exceeds the negative reference voltage input. Comparator 33 has a positive reference voltage applied to the noninverting input thereof and responds to a positive signal which exceeds the positive reference voltage. The comparators 31 and 33 are connected so that when the output of the summing network 29 exceeds the negative or positive reference voltage levels the respective comparator output goes from normal logic "1" to a logic "0" level and remains at the "0" level until the voltage level drops to within the respective reference levels. The comparator outputs are or'ed by means of NOR-gate 35 so that either "Up" or "Down" pulses from generator 17 will provide a moving signal, a logic "1" at the output of NOR-gate 35, which is used elsewhere in the system as will be explained later.

Two modes of operation can be described for the moving detector circuit. The first is the axis vibrating mode. In this mode "Up" and "Down" pulses trigger their respective monostable flip-flops alternatively; a string of "Up" pulses would be followed by a string of "Down" pulses. The string of "Up" pulses would cause the voltage at the output of filter network 25 to go in a positive direction; the following string of "Down" pulses would cause the output of filter 27 to go in a negative direction. Due to the selected time constants of the filter circuits (25, 27) and summing network 29, the offsetting effects keep the summing network output below the threshold of each of the comparators 31 and 33, thereby blocking a moving indication.

In the moving mode almost all, if not all, of the flip-flop trigger pulses would be either "Up" or "Down." Thus, the output of the summing network will increase or decrease accordingly. Once the reference voltage is exceeded in either direction, the output of gate 35 would go high ("1"), indicating a moving condition. The comparator amplifiers reference voltages are picked such that they are compatible with the particular speed of the machine axis so as to provide the two separate modes of operation, vibrating and moving.

A single OSCILLATOR 37 is used to provide trigger pulses which are qualified by the moving signal from gate 35. The oscillator output is and'ed with the moving signal by means of NAND-gate 39 to produce a clock signal when a moving signal is obtained.

The clock period must be greater than the system response time. This is one of the conditions necessary to insure that a correction would not cause the DC level to overshoot the hysteresis band of the Schmitt trigger circuits. The signal DC level for each channel is sensed at the outputs F and H, respectively, and each treated in the same manner. Therefore, only one automatic control channel will be explained in detail. The other channel consists essentially of the same parts and will be indicated by like primed reference numerals.

As shown in FIG. 2, the output F of amplifier 9 is connected to the input E of a filter 41. Generally, the signal is comprised of a DC voltage, which is to be kept within the limits of the width of the hysteresis loop of the Schmitt trigger circuit, and one of the quadrature signals, of which the frequency is a function of the machine slide velocity. Thus, filter 41 is a low-pass filter which attenuates the quadrature signal and provides an acceptably low attenuation of the DC signal level with little loading of the amplifier output.

The output of filter 41 is connected to the noninverting input of a comparator 43 which has a negative reference voltage applied to the inverting input thereof, and to the inverting input of a comparator 45 which has a positive reference voltage applied to the noninverting input thereof. These comparators are identical to those described above in connection with the moving detector and act as comparators whose outputs are normally in a logic "1" state. They are or'ed together by means of NOR-gate 47 so that if one of the reference voltages is exceeded, an adjust signal ("1" logic level) is generated at the NOR-gate 47 output. When the DC level exceeds the positive reference voltage, the output of comparator 45 changes states, presenting a logic "0" to one input of NOR-gate 47; and when the DC level exceeds the negative reference voltage applied to comparator 43, the output of comparator 43 changes states presenting a "0" to a second input of NOR-gate 47. Thus, when either of the inputs are "0" a "1" is generated at the output of gate 47.

The output of NOR-gate 47 is connected to one input of a NAND-gate 49 together with the clock pulse obtained at the output of NAND-gate 39 when moving has been detected. The output of gate 49 is connected to the count trigger input of a bidirectional counter 51. The direction in which the counter counts is controlled by the output of comparator 45, which is connected to the direction control input of counter 51. Thus, if the output of comparator 45 is a "0," indicating that the positive limit has been exceeded, a logic "0" is applied to the direction control input of counter 51 causing it to count down.

The output of counter 51 is connected to corresponding inputs of a digital-to-analog converter 53 which converts the digital count stored in the counter to a proportional analog feedback signal which is fed to the input of amplifier 9 (FIG. 1) through a noninverting amplifier 55 and a filter circuit 57. The output of amplifier 55 is filtered in order to prevent spurious voltage changes caused by transient states of the counter from distorting the quadrature signals processed by the DC amplifier 9.

As pointed out above, amplifier 11 is connected to an identical feedback circuit indicated by like primed numerals. The output H is connected to the input H of filter 41' and the input G is connected to the output G of filter 57'. The clock pulses from the output of NAND-gate 39 are likewise applied to one input of NAND-gate 49' to supply the count trigger at the output of gate 49' when an adjust signal is present from NOR-gate 47'.

The system operates in the following manner. With the interferometer on, the operator depresses the preset buttons 59 and 59', connected together by a single actuator connection 61, which sets the respective counters 51 and 51' to their midrange count. With the preset buttons held in the depressed position, the DC level of each amplifier 9, 11 is centered within the hysteresis bands of the corresponding Schmitt trigger circuits 13, 15 in a conventional manner.

Assuming amplifiers 9 and 11 are operating without drifting, the weighted pulse generator 17 produces the proper output signals for the machine control unit (not shown) according to whether the machine axis is moving or not.

In the case where the machine axis is moving with +move signals being generated at the output C of generator 17 (FIG. 1), monostable flip-flop 21 receives these pulses along with the machine control unit. Filter 25 extracts the DC component present on the output of the flip-flop. Being a proper signal, it exceeds the +REF$_1$ voltage, and the logic comparator 31 changes states presenting a "0" to the input of NOR-gate 35, thereby indicating a moving condition. This, in turn, allows the oscillator 37 to pass the system clock pulses through gate 39 to NAND-gates 49, 49'.

Meanwhile the DC component of the output F of amplifier 9 is being monitored at the inputs of logic comparators 43 and 45. The −REF$_2$ and +REF$_2$ voltages are adjusted to be within the Schmitt trigger 13 hysteresis band. Typically, these reference voltages are −REF$_2$=−0.3 V and +REF$_2$=+0.3 v. Since the amplifier 9 is not drifting, neither comparator 43 nor 45 changes states and the signal stops here.

In the same manner of operation, comparator 43' and comparator 45' monitor the DC component of the output H of amplifier 11 and as long as there is no drift detected by the comparators there is no adjustment made at the input of amplifier 11 either.

Assuming now that one amplifier, say amplifier 9, drifts so that the DC level on which the light detector signal rides approaches the upper (positive) voltage triggering level of the Schmitt trigger 13, comparator 45 will change states to the "0" logic level.

Since the adjust input to NAND-gate 49 is "1," the clock pulses will be passed and accumulated in counter 51. The output of comparator 45 being a logic "0" causes the counter to count down. As the clock pulses are accumulated in counter 51, they are converted to an equivalent analog signal and fed back to the input E of amplifier 9 through amplifier 55 and filter 57 to compensate for the drift by lowering the input DC level.

In a like manner, a negative drift is compensated by activating comparator 43 and counting the counter up, since the sign to the counter direction input is a "1" due to comparator 45 being in the normal state.

It will also be seen that the drift in amplifier 11 will be compensated in the same manner as discussed above for the first channel and therefore its operation need not be discussed.

The counter used in a particular application would depend upon the range of voltage control necessary for the particular application. In the particular application exemplified here, a four-bit counter would have satisfied the requirements, but a six-bit reversible ripple counter with sign control for count direction was used to increase the resolution of the system. Since a single correction must not cause the DC level to overshoot the Schmitt trigger hysteresis band, each count could represent no more than a 0.75 volt DC level change, but this may be reduced to 0.5 v. or less to be compatible with the DC level sensor deadband. Since the total range of the circuit would be typically of 6 volts, ±3 v. from the center of the hysteresis band, a total change of 6 volts must be possible.

With $2^6$ counter states, each step could represent a DC level change of (6v./$2^6$) =0.094 volt. The principal system time delays are due to the output filter 57 used to suppress counter transients and the input filter 41 of the DC level sensor which attenuates the AC portion of the signal and passes the DC component. The system response time will determine the maximum clock pulse rate that can be used. If the clock period is equal to or greater than the system response time then the correction will be spaced with adequate time to allow the DC level to respond to one correction before a subsequent one is made. The time constant computed for the system here was $170 \times 10^{-3}$ sec. Although a clock period equal to this response time could result in one end only one clock count beyond the minimum number required to return the DC level to within the range of ±0.30 volt, the 0.30-volt range would not be overshot since each step is only 0.094 volt nominally. Therefore, a clock frequency of 7.0 hertz can be safely used. It is desirable to make corrections at the fastest possible rate without overshoot so that necessary adjustments can be made during short moving periods.

Accordingly, it will be seen that a system has been provided which will automatically compensate for DC level drift in a DC-coupled amplifier which has a signal whose information is contained in the signal phase and is particularly useful in automatically maintaining the DC level of an interferometer feedback system within the hysteresis band of the Schmitt trigger circuits to prevent counting errors due to DC level drift of the feedback signal amplifiers.

What is claimed is:

1. An automatic DC level control system for a DC-coupled amplifier, comprising:
    a bidirectional counter;
    a comparator means coupled to the output of said amplifier for comparing the DC voltage level at the output of said amplifier with a first reference voltage so as to provide a first output signal at an output thereof when the amplifier DC voltage exceeds said first reference voltage and with a second reference voltage so as to provide a second output signal at the output thereof when the amplifier DC voltage drops below said second reference voltage;
    an oscillator for generating clock pulses;
    gating means having a first input connected to the output of said oscillator and a second input connected to the output of said comparator means and an output connected to the count trigger input of said counter for gating said clock pulses into said counter responsive to the output of said comparator means;
    means responsive to the output of said comparator means for controlling the direction of counting of said bidirectional counter; and a digital-to-analog converter connected between the output of said counter and the input of said DC amplifier, thereby controlling the DC level of said amplifier within predetermined limits determined by the selected values of said first and second reference voltages.

2. An automatic DC level controller as set forth in claim 1 wherein said comparator means includes first and second comparators, each having an inverting and noninverting input and an output; said noninverting input of said first comparator connected to receive said first reference voltage, said inverting input of said second comparator connected to receive said second reference voltage and said inverting input of said first comparator and said noninverting input of said second comparator being coupled to the output of said pulse amplifier; and a NOR-gate having first and second inputs and an output, said first input connected to the output of said first comparator, said second input connected to the output of said second comparator and said output connected to said second input of said gating means.

3. An automatic DC level controller as set forth in claim 2 wherein the count direction control means of said bidirectional counter is connected to the output of said first comparator circuit, whereby when the DC voltage of said DC amplifier exceeds said first reference voltage said counter is switched from the forward count to the reverse count state.

4. An automatic DC level controller as set forth in claim 3 further including a first filter circuit for connecting the output of said DC amplifier to the input of said comparator means so as to attenuate the AC signal output of said pulse amplifier, a feedback amplifier connected to the output of said digital-to-analog converter and a second filter circuit connecting the output of said feedback amplifier to the input of said DC amplifier.

5. An automatic DC level controller as set forth in claim 4 wherein said oscillator clock pulses have a period substantially lower than the time constant of said control system.

6. An automatic DC level control system for use in an interferometer feedback system wherein a pair of channels are provided for detecting and shaping, respectively, a pair of light interference signals generated by the interferometer and having a quadrature relationship, one signal leading the other depending upon the direction of motion being sensed by the interferometer, each channel including photodetector means for sensing the interference signal, a DC amplifier connected to the output of said photodetector means and a trigger circuit having a predetermined upper nd lower triggering voltage level, said DC level control system comprising:

first and second bidirectional counters;

first and second comparator means coupled respectively to the outputs of said DC amplifiers of said pair of channels each for comparing the DC voltage level at the output of said DC amplifier with a first reference voltage so as to provide a first output signal at an output thereof when the DC voltage level of said DC amplifier exceeds said first reference signal and with a second reference voltage so as to provide a second output signal at the output thereof when the DC voltage level of said DC amplifier drops below said second reference voltage;

an oscillator for generating clock pulses at an output thereof;

a first gating means having a first input connected to the output of said oscillator and a second input connected to the output of said first comparator means and an output connected to the count trigger input of said first bidirectional counter for gating said clock pulses into said first counter responsive to the output of said first comparator means;

a second gating means having a first input connected to the output of said oscillator and a second input connected to the output of said second comparator means and an output connected to the count trigger input of said second bidirectional counter for gating said clock pulses into said second counter responsive to the output of said second comparator means;

means responsive to the outputs of said first and second comparator means for controlling the direction of counting of said first and second bidirectional counters, respectively; and first and second digital-to-analog converters connected, respectively, between the outputs of said first and second counters and the inputs of said first and second channel DC amplifiers.

7. An automatic DC level control system for use in an interferometer feedback system as set forth in claim 6 further including means for disabling the application of said clock pulses to the count trigger input of said first and second bidirectional counters when there is no movement being detected by said interferometer.

* * * * *